US009557989B2

(12) United States Patent
Dobinson

(10) Patent No.: US 9,557,989 B2
(45) Date of Patent: Jan. 31, 2017

(54) COMPARISON AND MERGING OF IC DESIGN DATA

(71) Applicant: Dassault Systemes Enovia Corp., Waltham, MA (US)

(72) Inventor: Ian Dobinson, Thatcham (GB)

(73) Assignee: Dassault Systemes Americas Corp., Waltham, MA (US)

( * ) Notice: Subject to any disclaimer, the term of this patent is extended or adjusted under 35 U.S.C. 154(b) by 740 days.

(21) Appl. No.: 14/036,734

(22) Filed: Sep. 25, 2013

(65) Prior Publication Data

US 2015/0088861 A1   Mar. 26, 2015

(51) Int. Cl.
G06F 17/50   (2006.01)
G06F 17/30   (2006.01)
G06F 9/44    (2006.01)

(52) U.S. Cl.
CPC .............. *G06F 8/71* (2013.01); *G06F 17/5045* (2013.01); *G06F 17/5081* (2013.01); *G06F 17/3023* (2013.01); *G06F 17/3071* (2013.01); *G06F 17/30309* (2013.01); *G06F 2217/04* (2013.01); *G06F 2217/74* (2013.01)

(58) Field of Classification Search
CPC ............ G06F 17/30371; G06F 17/3023; G06F 17/30309; G06F 17/5045
USPC .......... 716/100–101; 707/790, 802, 687, 695
See application file for complete search history.

(56) References Cited

U.S. PATENT DOCUMENTS

| 7,420,573 | B1 | 9/2008 | Aberg et al. |
| 8,286,132 | B2 | 10/2012 | Yuan et al. |
| 8,291,329 | B2 | 10/2012 | Hsu et al. |
| 8,386,910 | B2 | 2/2013 | Abe et al. |
| 2008/0244482 | A1 | 10/2008 | Chang et al. |
| 2012/0317525 | A1 | 12/2012 | Chapman |

FOREIGN PATENT DOCUMENTS

WO   WO 2009/152249 A2   12/2009

OTHER PUBLICATIONS

European Search Report from European Application No. 14185899.3; Date Mailed: Feb. 17, 2015; Entitled, "Comparison and Merging of IC Design Data".

*Primary Examiner* — Stacy Whitmore
(74) *Attorney, Agent, or Firm* — Hamilton, Brook, Smith & Reynolds, P.C.

(57) ABSTRACT

The proposed approach includes a method and system for managing integrated circuit (IC) design information for multiple data stores. Each data store is split into sections, allowing larger data sets to be compared. Keys are assigned to objects in each data set, in order to determine if objects are added, deleted, or modified between multiple data stores, and also to determine object differences. The user may compare and merge differences between the data stores, using either a graphical or text-based approach. The proposed approach is highly efficient and accurate for large databases. The proposed approach allows the user to easily visualize differences in complex databases and to merge in desired changes easily.

15 Claims, 16 Drawing Sheets
(9 of 16 Drawing Sheet(s) Filed in Color)

FIG. 1 – PRIOR ART

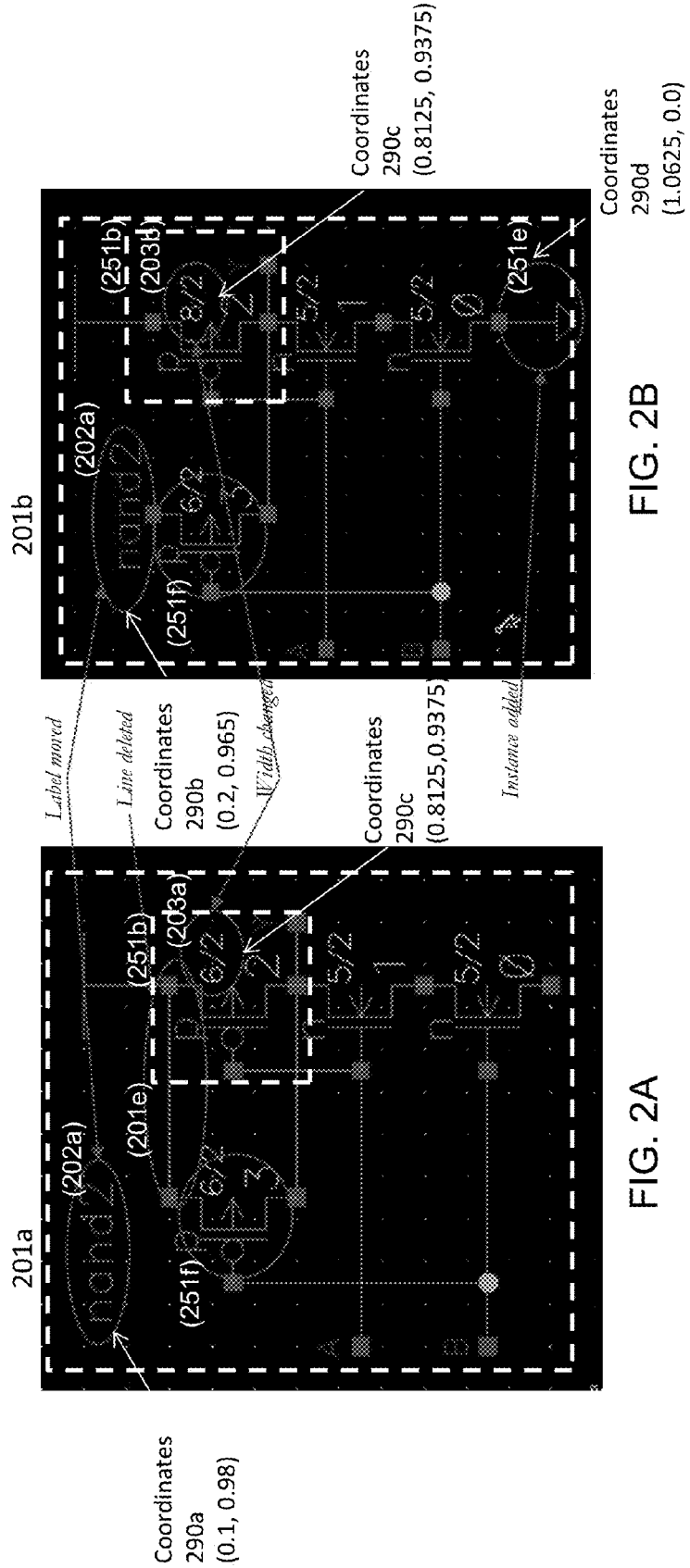

COMPARISON AND MERGING OF IC DESIGN DATA

BACKGROUND OF THE INVENTION

As any data is developed over time, multiple versions of the data are generated (as data files, databases, or data stores), potentially by multiple people, working on separate copies. At various times it is desirable to compare the different versions of the data, and potentially to "merge" the changes made by different edits to each of the versions of the data.

For data in the form of one or more "text" files, such as simple documents, many tools have been developed using various algorithms to identify what changes are made and to provide interfaces to combine the changes. All of these algorithms generally operate by identifying file "regions" that are identical or different. These "regions" generally take the form of one or more lines of the file. Once the differences are identified, merging usually involves simply adding and/or removing lines from the "result" file to better match the source file(s).

In an Integrated Circuit (IC) design environment, the IC data does not generally take the form of simple "text" files, but is instead in the form of "databases," such as one or more binary files, data stores, data libraries, or other types of IC data. The IC data may include (very) large numbers of "objects" of various types with various different "properties." By its nature, as opposed to "text" files, an IC design is often three-dimensional, having multiple layers (for example, metal1, metal2, and metal3), which further increases the number of "objects" that need to be stored. The user generally interacts with such IC data through using graphical design tools. Therefore, an approach is needed for managing such complex data for ICs that goes beyond the standard text file data management.

SUMMARY OF THE INVENTION

It is very challenging to apply existing solutions for comparison and merge of text files to databases (or data stores, generic data stores, one or more binary files, data libraries, or other types of files or data storage), for at least the following four primary reasons.

First, the simple "linear" comparison of "lines" does not translate to databases, where the "objects" are not necessarily "ordered" in a consistent way. Even if database objects have positional co-ordinates, comparison is preferably not based on those, as it is common for objects to change position, and this needs to be identified correctly (and not, for example, as the object being deleted and a new object being added.)

Second, there may be objects in a database that are the "same" but "modified." In the same way that two lines of a file may seem to be the same but have one or two characters that are different, in a database there may be two objects that are the same but different in some "properties." Whereas in a text comparison, such a case may be handled as if the whole line were different, in a database this would be highly inefficient.

Third, the size of the design databases for comparison is generally orders of magnitude larger than text files. For example, whereas it may be "reasonably" expected to compare/merge a text file of a few thousand lines, it is not be uncommon to compare/merge a database comprising several hundred thousand objects.

Fourth, the steps required to identify the "differences" in two objects in a database, and the steps required to "merge" those differences, are far more complex than simply comparing two lines of text and replacing one line with the other line. Indeed, for the database there may be many types of objects which need to be handled in different ways.

Overall, it is very challenging to present the differences found in databases to the user as simple lines of text. An alternative method of describing the changes and allowing the user to visualize them, and then allowing the user to see the results of any "merge," is required.

In view of this need for an alternative method, the proposed approach below includes at least the following four elements (and additional elements to follow) that overcome the above-mentioned challenge of presenting database differences.

First, the database is split into sections. This gives smaller sets of objects for comparison, and thus allows much larger datasets for comparison.

Second, the objects in the database are assigned "keys" based on certain aspects of the objects. The keys in two databases are then compared to identify objects that are the "same." This allows accurate identification of whether items are added/deleted or just changed. Two objects with the same key may then be examined in more detail to identify whether they are "modified".

Third, the differences between two databases are then presented to the user either as textual summaries of the differences or by highlighting on a graphical representation of the database where the differences are. This makes it easy for the user to see the differences and examine them for impact in the context of the rest of the database.

Fourth, one or more differences may then be selected, one by one or in groups, and one of the two databases may be modified so that it matches the other database (i.e., the selected changes may be merged.)

The entire process, both of comparison and merge, may be customized by one or more users in order to meet any specific requirements or specific aspects of the databases that the one or more users are using.

The proposed approach includes a computer-implemented method for managing integrated circuit (IC) design information. The computer-implemented method may represent a first version of a subject IC design information in a first data store and represent a second version of the subject IC design information in a second data store. The method may partition the first data store into a plurality of sections, each section holding respective objects representing portions of the subject IC design information in the first version. The method may partition the second data store into sections corresponding to the plurality of sections of the first data store, each section of the second data store holding respective objects representing portions of the subject IC design information in the second version.

For each section, the method may assign a key to each object in the section according to an aspect of the objects, such that said assigning of keys results in the following: (a) a same key may be assigned to (i) a subject object in a section in the first data store and to (ii) an object in the corresponding section in the second data store that is a corresponding object to the subject object in the first data store, and results in (b) respective keys being assigned to each object not otherwise having been assigned a key.

For each given section, the method may determine whether an object of the section is added, deleted or modified, by performing a first comparison, based upon keys of the objects in the section in the first data store and keys of the objects in the corresponding section in the second data store. For each given object in the first data store, and its corresponding object that shares the same key in the second data store, the method may perform a second comparison that determines one or more object differences. Based on results of the first and second comparisons, the method may present one or more differences between the first version of the subject IC design information in the first data store and the second version of the subject IC design information in the second data store.

The computer-implemented method may enable an end user to select a difference set of at least one of the one or more differences, and may enable the end user to apply the selected difference set to the second version of the subject IC design information in the second data store. The computer-implemented method may include the one or more differences being presented to an end user in a textual format. The computer-implemented method may include the one or more differences being presented to an end user by highlighting each difference on a graphical representation. The computer-implemented method may assign a key to each object including assigning the key based on any combination of positional information and property information of the object.

The computer-implemented method may represent an ancestor version of the subject IC design information in an ancestor data store, the first and second versions being from the ancestor version. The computer-implemented method may further include partitioning the ancestor data store into sections corresponding to the plurality of sections of the first data store and the second data store, each section of the ancestor data store holding respective objects representing portions of the IC design information in the ancestor version.

For each section in the ancestor data store, the method may assign a key to each object according to the aspect of the objects, such that for each section of the ancestor data store: (1) a same key is assigned to a given object in the section of the ancestor data store and corresponding objects in corresponding sections of the first data store and the second data store that correspond to the given object in the ancestor data store, and (2) respective keys are assigned to remaining objects in the section of the ancestor data store.

For each given section, the method may determine whether an object of the section is added, deleted or modified, by performing a third comparison. The third comparison may be based upon keys of the objects in the section in the first and second data stores and keys of the objects in the corresponding section in the ancestor data store. For each given object in the first and second data stores, and its corresponding object that shares the same key in the ancestor data store, the method may perform a fourth comparison that determines one or more respective object differences.

Based on results of the third and fourth comparisons, the method may present at least one difference between the ancestor version of the subject IC design information in the ancestor data store. The method may also present at least one of the first version of the subject IC design information in the first data store and the second version of the subject IC design information in the second data store. The method may enable an end user to select a respective difference set of at least one of the at least one difference. The method may enable the end user to apply the selected respective difference set to the second version of the subject IC design information in the second data store.

The proposed approach includes a computer-implemented system for managing integrated circuit (IC) design information. The computer-implemented system may comprise a data module configured to represent a first version of a subject IC design information in a first data store. The data module may be further configured to represent a second version of the subject IC design information in a second data store. A partitioning module may be configured to partition the first data store into a plurality of sections, each section holding respective objects representing portions of the subject IC design information in the first version. The partitioning module may be further configured to partition the second data store into sections corresponding to the plurality of sections of the first data store. Each section of the second data store may hold respective objects representing portions of the subject IC design information in the second version.

A control module may be configured to assign, for each section, a key to each object in the section according to an aspect of the objects, such that assignment by the control module of keys results in: (a) a same key being assigned, by the control module, to (i) a subject object in a section in the first data store and to (ii) an object in the corresponding section in the second data store that is a corresponding object to the subject object in the first data store, and results in (b) respective keys being assigned, by the control module, to each object not otherwise having been assigned a key by the control module.

The control module may be further configured to determine, for each given section, whether an object of the section is added, deleted or modified, by performing a first comparison, based upon keys of the objects in the section in the first data store and keys of the objects in the corresponding section in the second data store. The control module may be further configured to perform a second comparison, for each given object in the first data store, and its corresponding object that shares the same key in the second data store, the second comparison determining one or more object differences.

The system may include a display module, configured to present, based on results of the first and second comparisons, one or more differences between the first version of the subject IC design information in the first data store and the second version of the subject IC design information in the second data store.

The control module may be further configured to enable an end user to select a difference set of at least one of the one or more differences. The control module may be further configured to enable the end user to apply the selected difference set to the second version of the subject IC design information in the second data store.

The display module may be further configured to present the one or more differences to an end user in a textual format. The display module may be further configured to present the one or more differences to an end user by highlighting each difference on a graphical representation. The control module may be further configured to assign a key to each object, the control module assigning the key based on any combination of positional information and property information of the object.

The data module may be further configured to represent an ancestor version of the subject IC design information in an ancestor data store. The first and second versions may be from the ancestor version.

The partitioning module may be further configured to partition the ancestor data store into sections corresponding to the plurality of sections of the first data store and the second data store, each section of the ancestor data store holding respective objects representing portions of the IC design information in the ancestor version.

The control module may be further configured to assign, for each section in the ancestor data store, a key to each object according to the aspect of the objects, such that for each section of the ancestor data store: (1) a same key is assigned, by the control module, to a given object in the section of the ancestor data store and corresponding objects in corresponding sections of the first data store and the second data store that correspond to the given object in the ancestor data store, and (2) respective keys are assigned, by the control module, to remaining objects in the section of the ancestor data store.

The control module may be further configured to determine, for each given section, whether an object of the section is added, deleted or modified, by performing a third comparison. The third comparison may be based upon keys of the objects in the section in the first and second data stores and keys of the objects in the corresponding section in the ancestor data store. The control module may be further configured to perform a fourth comparison, for each given object in the first and second data stores, and its corresponding object that shares the same key in the ancestor data store. Through the fourth comparison, the control module may determine one or more respective object differences.

The display module may be further configured to present, based on results of the third and fourth comparisons, at least one difference between the ancestor version of the subject IC design information in the ancestor data store. The display module may also present at least one of the first version of the subject IC design information in the first data store and the second version of the subject IC design information in the second data store.

The control module may be further configured to enable an end user to select a respective difference set of at least one of the at least one difference. The control module may be further configured to enable the end user to apply the selected respective difference set to the second version of the subject IC design information in the second data store.

The proposed approach includes a non-transitory computer readable medium having stored thereon a sequence of instructions. The instructions, when loaded and executed by a processor coupled to an apparatus, may cause the apparatus to represent a first version of a subject IC design information in a first data store and represent a second version of the subject IC design information in a second data store. The instructions may cause the apparatus to partition the first data store into a plurality of sections. Each section of the first data store may hold respective objects representing portions of the subject IC design information in the first version. The instructions may cause the apparatus to partition the second data store into sections corresponding to the plurality of sections of the first data store. Each section of the second data store may hold respective objects representing portions of the subject IC design information in the second version.

The apparatus may assign, for each section, a key to each object in the section according to an aspect of the objects, such that assignment of keys results in: (a) a same key being assigned to (i) a subject object in a section in the first data store and to (ii) an object in the corresponding section in the second data store that is a corresponding object to the subject object in the first data store, and results in (b) respective keys being assigned to each object not otherwise having been assigned a key.

The apparatus may determine, for each given section, whether an object of the section is added, deleted or modified, by performing a first comparison. The comparison may be based upon keys of the objects in the section in the first data store and keys of the objects in the corresponding section in the second data store. The apparatus may perform a second comparison, for each given object in the first data store, and its corresponding object that shares the same key in the second data store. The second comparison may determine one or more object differences. The apparatus may present, based on results of the first and second comparisons, one or more differences between the first version of the subject IC design information in the first data store and the second version of the subject IC design information in the second data store.

The apparatus may enable an end user to select a difference set of at least one of the one or more differences. The apparatus may also enable the end user to apply the selected difference set to the second version of the subject IC design information in the second data store.

The apparatus may present the one or more differences to an end user in a textual format. The apparatus may present the one or more differences to an end user by highlighting each difference on a graphical representation. The apparatus may assign a key to each object, the apparatus assigning the key based on any combination of positional information and property information of the object. The apparatus may represent an ancestor version of the subject IC design information in an ancestor data store, the first and second versions being from the ancestor version. The apparatus may partition the ancestor data store into sections corresponding to the plurality of sections of the first data store and the second data store. Each section of the ancestor data store may hold respective objects representing portions of the IC design information in the ancestor version.

The apparatus may assign, for each section in the ancestor data store, a key to each object according to the aspect of the objects, such that for each section of the ancestor data store: (1) a same key being assigned to a given object in the section of the ancestor data store and corresponding objects in corresponding sections of the first data store and the second data store that correspond to the given object in the ancestor data store, and (2) respective keys being assigned to remaining objects in the section of the ancestor data store.

The apparatus may determine, for each given section, whether an object of the section is added, deleted or modified, by performing a third comparison. The third comparison may be based upon keys of the objects in the section in the first and second data stores and keys of the objects in the corresponding section in the ancestor data store. The apparatus may perform a fourth comparison, for each given object in the first and second data stores, and its corresponding object that shares the same key in the ancestor data store. The fourth comparison may determine one or more respective object differences.

The apparatus may present, based on results of the third and fourth comparisons, at least one difference between the ancestor version of the subject IC design information in the ancestor data store. The apparatus may also present at least one of the first version of the subject IC design information in the first data store and the second version of the subject IC design information in the second data store.

The apparatus may enable an end user to select a respective difference set of at least one of the at least one difference. The apparatus may enable the end user to apply the selected respective difference set to the second version of the subject IC design information in the second data store.

An advantage of the present invention is that it is highly efficient for large databases. Another advantage of the present invention is that it provides a customizable degree of accuracy. Yet another advantage of the present invention is that it allows the users to easily visualize the differences in complex databases and to merge only those changes that are required.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 illustrates a comparison of text file differences.

FIG. 2A illustrates an embodiment of the present invention with a first version of a simple schematic.

FIG. 2B illustrates an embodiment of the present invention with a second version of the schematic of FIG. 2A.

DETAILED DESCRIPTION OF THE INVENTION

Figure 2C:
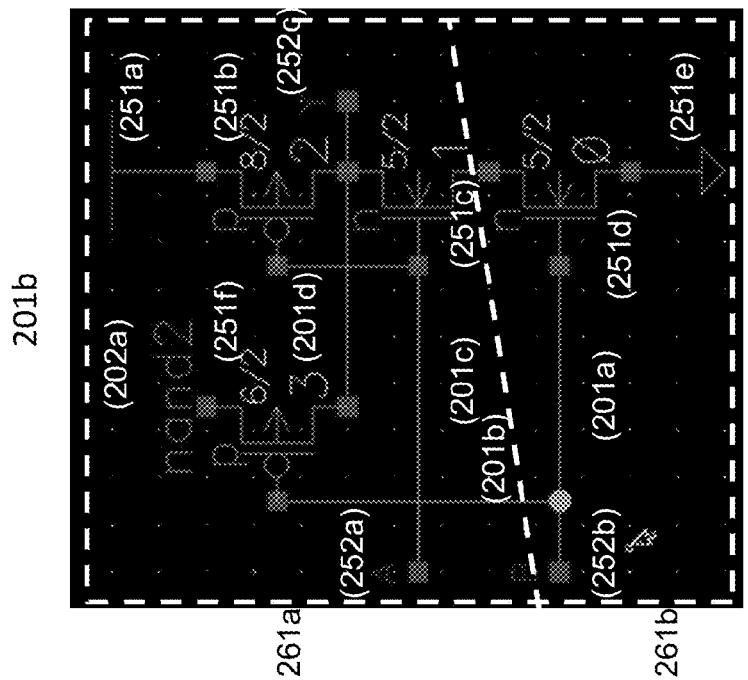
FIG. 2C illustrates one embodiment of the present invention, illustrating a form of partitioning, for the schematic of FIG. 2B.

A description of example embodiments of the invention follows.

Figure 1:
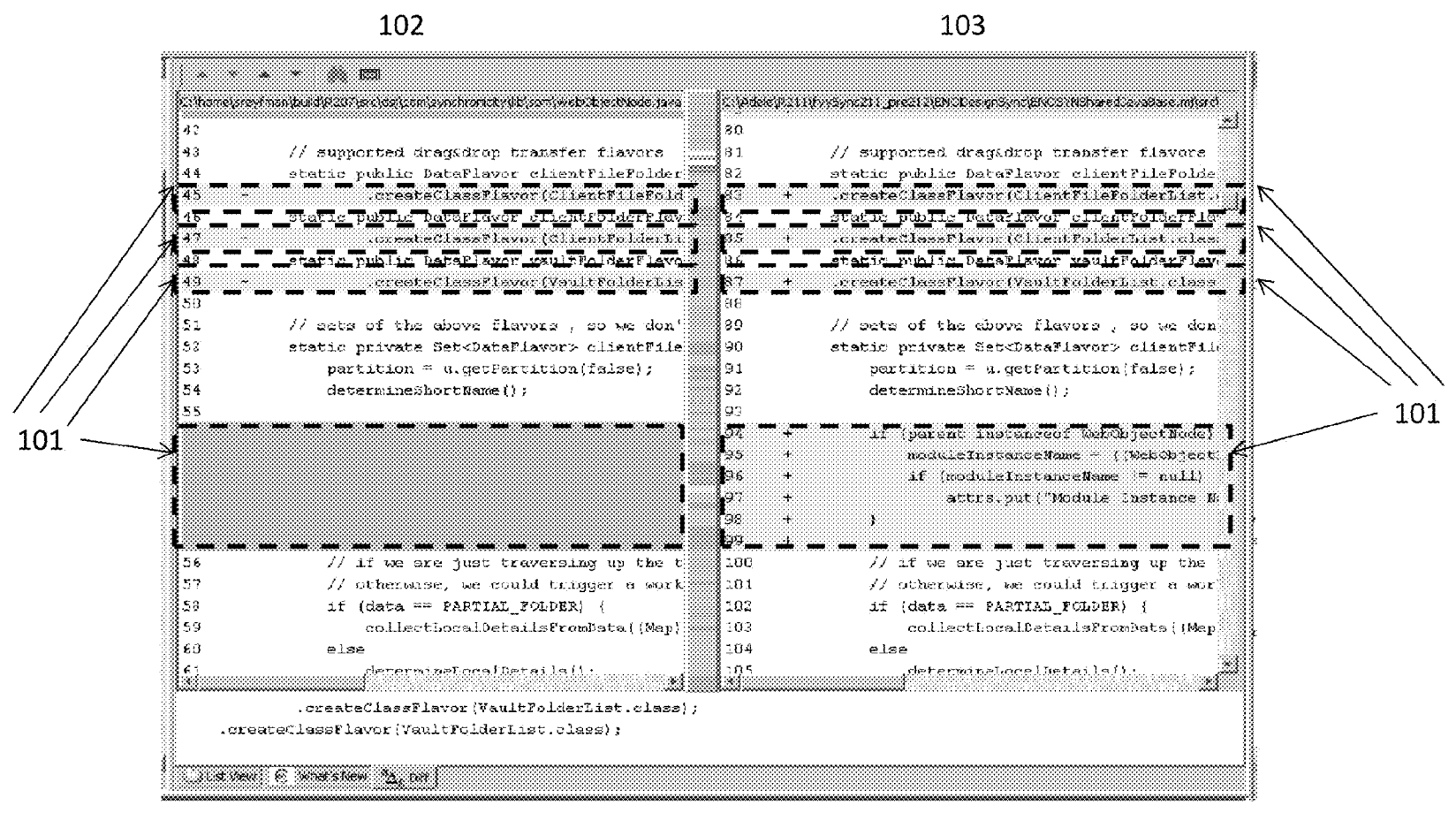

As previously described, existing algorithms generally operate by identifying regions of text files that are identical or different. Please refer to FIG. 1 for an illustration of comparing text file differences. As illustrated in FIG. 1, the text comparison regions generally take the form of one or more lines of the files. Once the file differences 101 are identified, merging usually involves simply adding and/or removing lines from a result file to better match the source files 102, 103.

As opposed to merely handling text files, the proposed approach provides a method and system for comparing, and subsequently merging, data between design databases.

In addition to handling text files, existing approaches handle IC design databases, but the existing approaches are deficient because they fail to compare and merge databases (such as data stores, binary data file(s), data libraries, or other types of IC design data). Such existing IC database approaches also fail to handle two-way or three-way data comparisons, and merging of the differences found. Such existing IC database approaches may benefit from the application of the present invention, which handles comparison and merging in a user-friendly manner.

The present invention may be implemented using existing programming languages and may be added to (and is compatible with) existing IC database design frameworks. For example, the present invention may be implemented using the SKILL extension programming language, although the present invention is not limited to using the SKILL extension programming language and may be implemented using other programming languages. Also, the present invention may be added to existing design frameworks that use the "Open Access" (also known as "OpenAccess" or "OpenAccess Coalition") database format, although the present invention is not so limited, and may be added to other types of frameworks that use other database formats.

Comparison

In order to compare two databases, which may be very large, it is preferable that several factors are taken into account. One such factor is how to partition the database into manageable sections. Another such factor is how to identify objects that are "the same" in the two databases, or objects that have been added and/or removed. Yet another such factor is, when objects are "the same," how to identify whether the objects have identical properties, and what the object property differences are.

For example, an object in a first database may be "the same" object in a second database. However, the object in the second database may be moved to a different position, compared with the position of the same (corresponding) object in the first database. Since the object was moved, the object in the second database may have a different (non-identical) position/location property compared with the position/location property of the same (corresponding) object in the first database.

Please refer to FIGS. 2A and 2B which illustrate example embodiments of the present invention. FIG. 2A illustrates an embodiment of the present invention with a first version of a simple schematic 201a. FIG. 2B illustrates an embodiment of the present invention with a second version 201b of the schematic of FIG. 2A.

In reference to FIGS. 2A-5D, operations are performed by the processor, apparatus, or computer system 1000 of the present invention, except where indicated as performed by the user.

The schematics of FIGS. 2A-2B look similar, but there are minor modifications between FIG. 2A and FIG. 2B. First, in FIG. 2B the label 202a identifies the schematic element 201b as a nand2 (a two-input negated AND gate), and this label 202a is moved by a user to a new location 290b, relative to its original location 290a in the schematic 201a of FIG. 2A. The label 202a in FIG. 2B is the same as the label 202a in FIG. 2A, just now in a new position 290b in FIG. 2B. Second, the "wire" 201e of FIG. 2A, that provides the power connection to the top left p-Channel Field-effect transistor (PFET) 251f, is removed in FIG. 2B by a user. Third, the "width" property of the right-hand PFET 251b is changed from a width of "6" (see element 203a at position 290c in FIG. 2A) to a width of "8" (see element 203b at position 290c in FIG. 2B) by a user. The PFET instance 251b is the same instance between the schematic 201a of FIG. 2A and the schematic 201b of FIG. 2B, however, the instance 251b in FIG. 2B has a new value 203b for an existing property 203a. Fourth, the ground (also known as "gnd") instance 251e (at position 290d) that is missing in FIG. 2A is now added into FIG. 2B by a user.

The proposed approach identifies these differences, and differentiates between "modifications" to existing items and additions/removals.

Database Partitioning

In order to make the data "Manageable", the database is first partitioned into different "kinds" of data (also known as "sections"), by the processor, apparatus or computer system 1000 of the present invention.

Figure 2D:
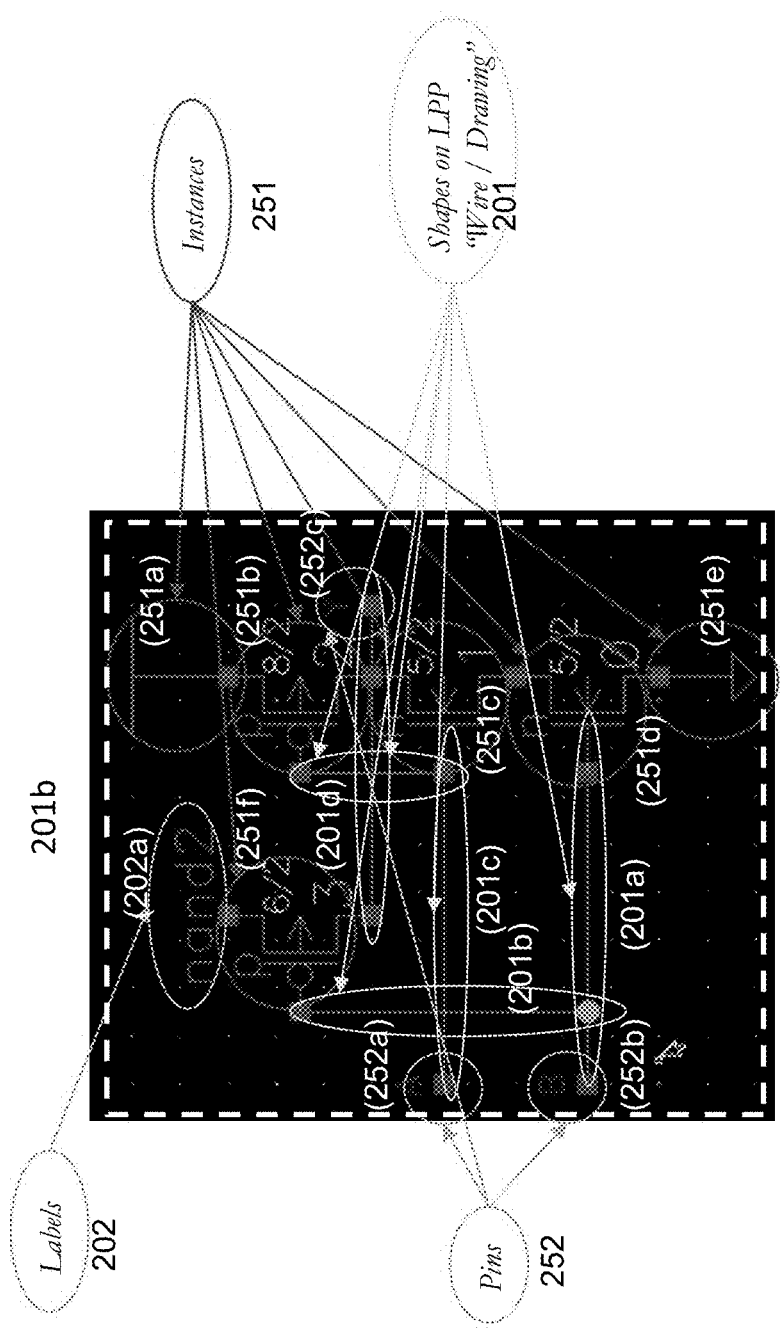
FIG. 2D illustrates another embodiment of the present invention, illustrating partitioning, from the schematic of FIG. 2B.

FIG. 2C illustrates one embodiment of partitioning the objects of FIG. 2B (schematic 201b) into sections 261a and 261b, by the processor, apparatus or computer system 1000 of the present invention. In FIG. 2D, the schematic of FIG. 2B is partitioned into two sections. The section 261b includes objects 201d, 251d, 251e, and 252b. The section 261a includes objects 201b, 201c, 201d, 202a, 251a, 251b, 251c, 251f, 252a, and 252c.

One embodiment for partitioning, in FIG. 2D, illustrates the schematic database 201b of FIG. 2B being partitioned into sections of wires 201, labels 202, instances 251, and pins 252.

The partitioning of FIG. 2D, by the processor, apparatus or computer system 1000 of the present invention, is described in more detail to follow. The "physical" shapes in the database, including but not limited to, wires 201, labels 202, paths, and other shapes, are associated with a "layer/purpose pair." That is, each shape has a combination of a "layer name" (this might be a physical layer, such as "poly silicon" or "metal layer 1" or a logical layer such as "wire" 201) and a "purpose" (for example, "drawing" or "layout"). This pair of a layer and purpose (an "lpp") is a common feature of design databases. Therefore, all "shapes" in the database are sorted according to the "lpp" value.

All "logical" elements in the database, including but not limited to, pins 252, instances 251, pins/terminals 252, and nets, have a "type" associated with them. Therefore, all "logical" elements in the database are sorted according to the "type".

Partitioning is implemented, by the processor, apparatus or computer system 1000 of the present invention, as a series of "extraction" (partitioning) routines, which pull out sub-sets of the database according to the above criteria. Embodiments of the present invention provide a set of "standard" extraction routines, but the user of the system may modify these routines (using an API provided by the present invention), to either extend the system to compare additional parts of the databases or to limit the comparison to areas of interest.

For the given database, the result of this part of the process is a series of smaller sub-sets (or "sections") of data, the sub-sets partitioned in such a way that each element of the database that needs to be compared is contained in exactly one sub-set, and, preferably, no two elements in different sub-sets of a given database are considered to be "the same" element. For the given database, this means that sub-sets preferably do not overlap, and each given object of a given sub-set is unique (not "the same") compared with each object in the other sub-sets of the given database. Note, an object in one database may be "the same" as another object in another database, but each object within a given database is preferably unique within that given database.

The exact criteria for partitioning of the data are dependent on the database format and the access procedures that are available. The above criteria are convenient for the Open Access database, and especially the SKILL language interface, but the proposed approach may use other criteria that may be more convenient for other databases.

Identifying Comparable Objects

Having partitioned the database into smaller sets, the next question is how to identify objects that "represent the same thing." This is a critical part of the proposed approach. If an object is "moved" then is it the same object? If an object is "renamed" is it the same object?

In a traditional compare of text files, lines are compared by "sections" of the file, if a line is moved from one place in a file to another, it is seen as a deletion in one place and an addition elsewhere. The traditional compare fails to meet the requirements of an IC design database, at least because of the following three deficiencies. First, in IC design, it is common for one or more objects to move, and just because an object moves, it is not a different object. Second, an IC design database is multi-dimensional (two, three, or more dimensions) in structure, so comparison by "area" is more complex and error prone. Third, in some cases, objects that are in exactly the same position and with different names or different properties may be considered an addition and removal, rather than a simple "modification."

The proposed approach overcomes the deficiencies of the traditional compare. In the proposed approach, every set of data associated with an "extraction" routine has a "key generation" routine associated with it. In the proposed approach, the "key generator" takes an object from the data set and produces a "key" which should be unique for that set of data. Then, the proposed approach compares the "key" values to identify whether objects are "the same" (but may have minor differences), or are completely different objects.

For example, the "key generator" for "labels" may produce a key based on the labels position or may produce a key based on the labels text. The actual keys produced in the reference implementation take the form of "lists" of values. This is convenient for the SKILL language, which makes it simple to compare the resulting lists.

Referring to the previous example in FIGS. 2A-2B, if the "key" for a label 202a is simply the text of the label 202a, then the resulting key for both schematic views (201a, 201b) is a key of ("nand2"), that is, a list including the string of the label "nand2" in 202a of FIGS. 2A-2B. As this is the same for both views, the comparison tool may identify that these two objects are the same (though they may be "different" in other ways—described in detail to follow.)

However, using a text label as a key may not be sufficient in a given scenario. There may be other labels in the schematics with the same text, leading to multiple elements generating the same key, which is preferably not allowed, since in that case it is very challenging to "match" them between the databases. Therefore, in a preferred embodiment, a key may be an x/y origin (or x/y coordinates) of the label. For example, please refer to an origin 290a of (0.1, 0.98) for 202a in FIG. 2A and an origin of 290b (0.2, 0.965) for 202a in FIG. 2B. In this scenario, the keys (290a, 290b) are different, and the comparison does not identify these as the "same" object 202a, rather, the comparison reports two differences: a label removed, and a label added.

Key generation is complex and is a trade-off between the need to generate unique values and the wish to mostly identify items that are "the same" correctly. The sample implementation provides a set of key generation routines that best handle these trade-offs, but the user is given the ability to replace these routines, if the user's design methodologies provide better alternatives. For example, if the user's design methodology and rules disallowed multiple labels of the same name, then using the label text is a better key than using the label position.

After evaluating a "key" for each object in a particular "partition" of the database, the comparison routine may then compare the keys in order to identify items that are "added" or "removed" or items that "are the same."

The Same but Different

Although two items return the same "key" they may have differences. This is equivalent to the case in a "text" comparison where a line is the "same" in two files but has been "modified," perhaps to add or remove some characters.

In these databases, the set of changes that may exist between objects that are "the same" is quite large. Objects may be the same, but "moved." Objects may be the same, but "renamed." Objects may be the same, but have changed properties. Often, many objects are included within cell views (or "cellviews," "data libraries"), such as a schematic view of the nand2 201a, or a layout of a central processing unit (CPU). Therefore, the next step of comparison is to take the items that are "the same" and perform a more detailed "difference check" of the objects.

Again, the exact comparison performed depends on the objects. It also depends heavily on the key generation: values already extracted as part of the key do not need to be compared. For example, if an "instance" has a key that includes the x/y position of the instance and the cell view names of the "parent" (or "master") cell view, then those values do not need to be re-compared by the detailed "difference check." However, as any rotation/reflection of the instance is not part of the key, that rotation/reflection is preferably part of the difference check.

In the sample implementation, "difference" routines check most aspects of the objects that are not part of the key. In particular, in the database in question, objects may have generic "property lists" which are compared. However, the proposed approach allows the user to override the standard difference routines in order to match the user's specific needs.

Reporting the Results

Identifying the differences between two databases is more beneficial if there is a clear way to inform the user of the differences that are found. The proposed approach employs a graphical approach, with a "multi-layered" scheme to report the differences in various levels of detail, and a capability to "highlight" the changes within the cell views themselves.

Figure 3A:
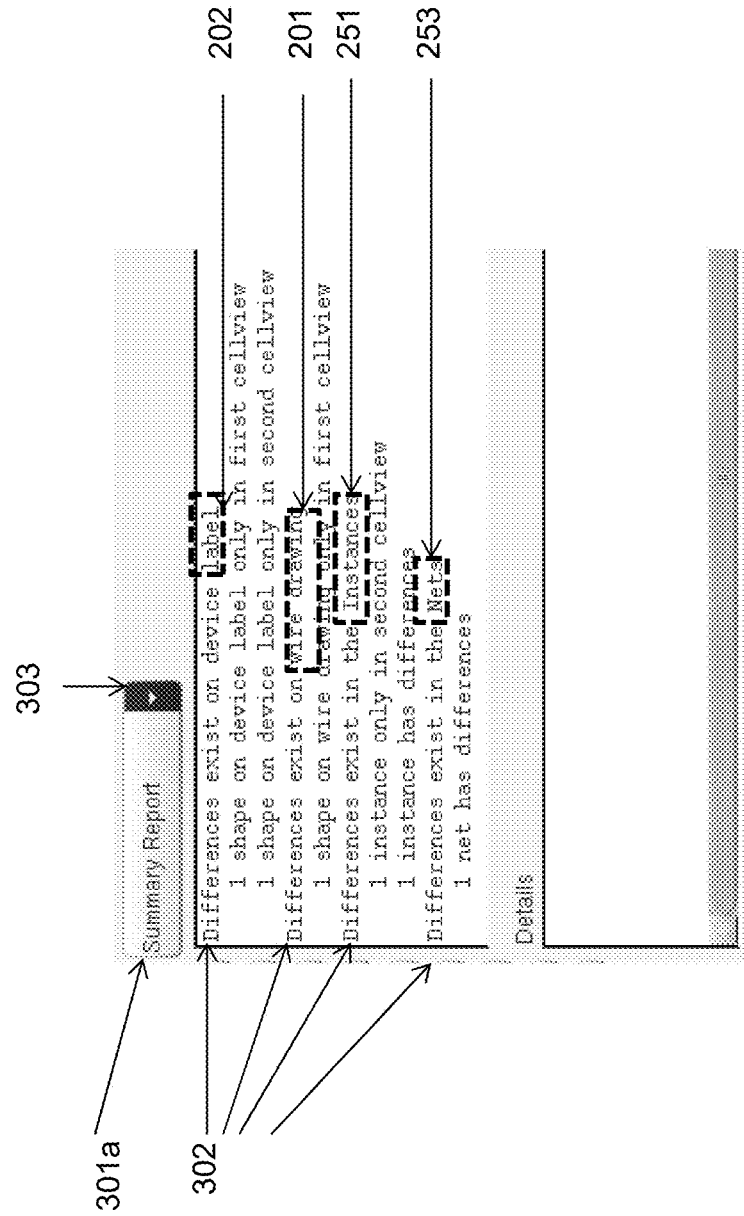
FIG. 3A illustrates a text-based summary report of the present invention.

In addition to the graphical approach, the processor, apparatus or computer system 1000 of the present invention also employs a text-based summary report, shown in FIG. 3A. The summary report of FIG. 3A illustrates form results that are initially displayed to the user when the comparison operation is performed. In FIG. 3A, a summary report 301a (selected through a pull down menu 303) indicates the differences 302 between the first cell view for 201a (in FIG. 2A) and the second cell view for 201b (in FIG. 2B).

As shown in FIG. 3A, the proposed approach determines the differences 302 between 201a and 201b found in each "partition" of the data as a simple summary, using the partitioning/sectioning scheme of FIG. 2D. In FIG. 3A, partitions are generated, by the processor, apparatus or computer system 1000 of the present invention, for wires 201, labels 202, instances 251, and nets 253.

For example, FIG. 3A illustrates differences 302 in the "instances" 251. The report of FIG. 3A indicates that one instance has differences (see width change of "6" to "8" from FIG. 2A element 203a to FIG. 2B element 203b). The report of FIG. 3A also indicates that one instance is only in the second cell view, and, therefore, an instance has been "added" (see instance 251e of FIG. 2B).

Figure 3B:
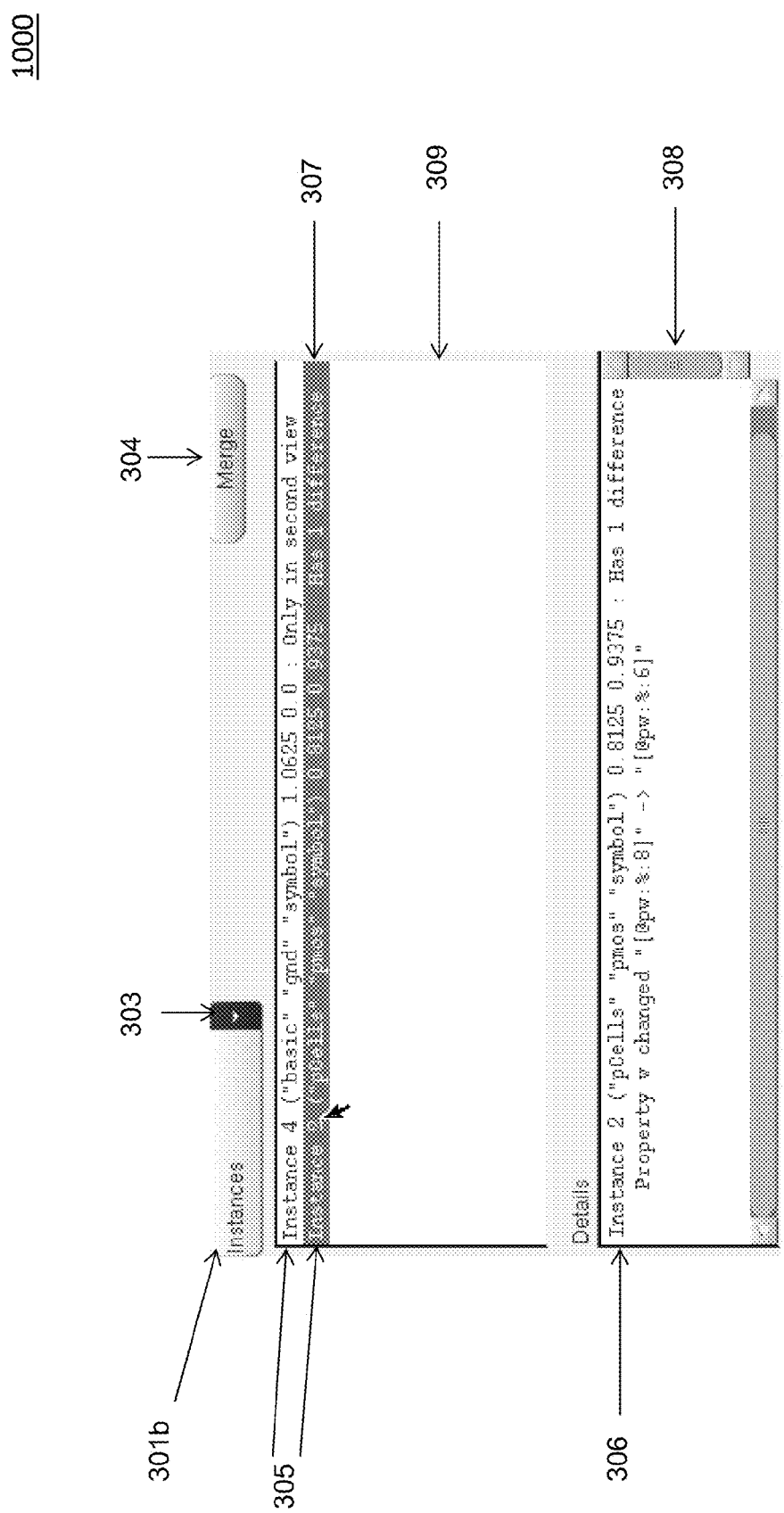
FIG. 3B illustrates a text-based summary report of the present invention, highlighting differences between FIG. 2A and FIG. 2B.

As shown in FIG. 3B, next, the user may use a drop-down field/menu 303 to select instances 301b and prune the results further to show the results applicable to just one "partition" of the data. The set of "partitions" shown is preferably dependent on the partitioning functions that are defined, and preferably, the partitions that result in differences are presented to the user.

In the case shown in FIG. 3B, the "instances" report 301b is selected by the user. As illustrated in FIG. 3B, by the processor, apparatus or computer system 1000 of the present invention, the instances report 301b shows the user more details of the differences 305 in the instances partition (251 of FIG. 3A). In particular, the differences 305, shown in the difference window 309, illustrate the instance names, and the details of the "key" generated for each instance (which enables the proposed approach used to find the key in the database), and a report on whether the instances are only in one of the cell views (an added or removed instance) or in both cell views but has some "differences." In the case of an object with "differences," a line selection 307 may be performed by the user, as shown in FIG. 3B, and complete details 306 of the associated differences are shown in the bottom panel 308. In the details section 306, the user may see that instance "2", at position (0.8125, 0.9375), which is an instance of cell pCells/pmos/symbol, has one difference, which is that property "w" has changed value: it now has a value of "8" (see FIG. 2B) and was a value of "6" (see FIG. 2A).

The exact form of the detailed textual report of results is controlled by the "difference check" routines. In FIG. 3B, it may be preferable to switch the way the property changes are shown, to report the "old" value first, and the proposed approach allows the user to perform this switch. In addition, in the proposed approach, the complete set of detailed results may be written to a file, providing a permanent record of the results, and allowing the results to be further analyzed. In addition, FIG. 3B illustrates merge capability 304.

Figure 3C:
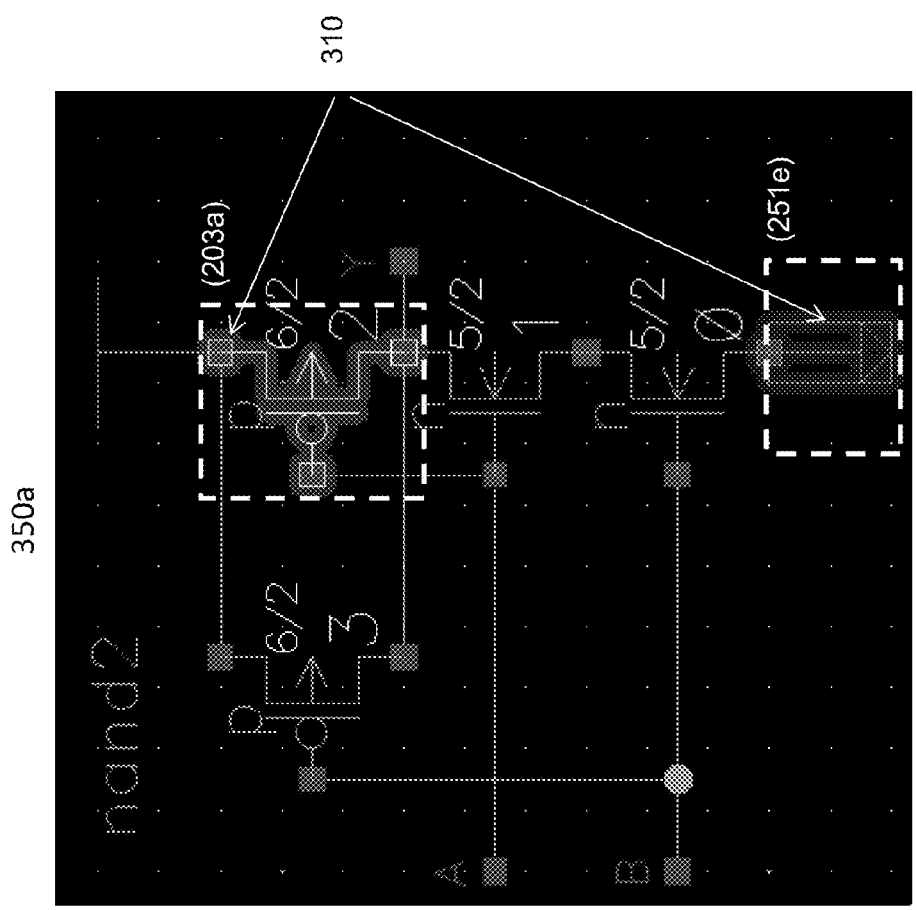
FIG. 3C illustrates a graphical view, of the present invention, highlighting differences between FIG. 2A and FIG. 2B.

As shown in FIG. 3C, by the processor, apparatus or computer system 1000 of the present invention, the proposed approach also allows for graphical differences/changes 310 to be "highlighted" directly on a graphical view 350a of the schematic in FIG. 3C. For example, in FIG. 3B, if the instance changes 305 are selected 307 by the user, then in the schematic view 350a, the graphical changes are highlighted 310 by the processor, apparatus or computer system 1000 of the present invention.

As shown in FIG. 3C, element 203a (the "pmos" symbol at the top) is highlighted in yellow, as this object is in both the first and second databases (see FIG. 2A 203a and FIG. 2B 203b) but has differences. The FIG. 3C, element 251e (ground symbol) at the bottom is highlighted in red, as it is not present in this particular view. Note that the proposed approach may highlight shapes (by comparing with other views) even if the shapes are not actually present in a given view.

Merging

Once the differences between two databases are identified, it is possible to consider "merging" those changes. The exact steps required to perform a merge may depend on factors, including the type of change, whether the change represents an "addition," "deletion," or simple "change," the API capabilities of the underlying system, and any "consequential" changes that are needed. For example, if a "net" is deleted, should the physical shapes associated with that net also be removed?

In the simple comparisons described previously (see Three-Way Comparisons below for a more complex case), it is never really appropriate to merge "all" differences. If merging all differences is the desired result, then a user may simply "copy" one database to another database.

The processor, apparatus or computer system 1000 of the present invention allows the user to select any sub-set of the comparison results and "merge" the differences from a "first" database (or cell view) to the "second" database (or cell view). For example, a wire in the first cell view that is not in the second cell view may be merged by creating the same wire in the second cell view. As another example, a label not in the first cell view that is in the second cell view may be merged by deleting the label from the second cell view. As yet another example, an instance of a cell view with a "width" property of "6" for the first cell view that has a width of "8" for the second cell view may be merged by changing that property to "6" in the second cell view.

The proposed approach provides a merge methodology, a way to merge changes, to the common database object types in the database, using the API functions that are available through the SKILL language, for example. However, as one skilled in the art realizes, this merge methodology may be modified by the end user to provide the end user's own merge functions as desired.

In performing certain merge operations, it may be necessary to identify equivalent objects in the database being merged into. For example, if merging across a net that is to be "added", it may be desirable to find in the second database equivalent "pins" to those to which the net is connected in the original database, so that the new net may be connected to them. In doing this, the proposed approach takes advantage of the same key generation used by the comparison functionality: in order to find the equivalent pin, the proposed approach finds one that generates the same key as the pin in the source database.

The order in which objects are merged may be important. For example, it may be desirable to merge pins before merging nets, in order that the pins exist to connect to the nets. If the user simply selects all nets and pins for merging, then the processor, apparatus or computer system 1000 of the present invention preferably needs to know that the pins are processed first. Knowledge of the database structure is used to define a default "order" for processing of merge requests, though this may be modified if required by the processor, apparatus or computer system 1000 of the present invention.

Three Way Comparisons

In the sample comparison above in FIGS. 2A-2B, it is difficult to know whether the "gnd" symbol was removed to generate the database shown on the left, or added to generate the database on the right. There is no indication of which database (first or second) might be the "later" version. This is why the report of the system 1000 simply states that the instance is "Only in second view" (see 305 in FIG. 3B). A user running the program may "know" that the database on the right (FIG. 2B 201*b*) is "later" than the one on the left (FIG. 2A 201*a*), and so this may not be an issue.

However, a very common need and use for a comparison tool of this kind is where two separate modifications are made to a database from the same starting point. In one example, a previous version of the database is stored in a data management system. Designer Fred fetches a copy of the database and starts making changes. Designer Jill also fetches a copy, makes some changes and stores the changes back into the data management system. At this point, Fred wants to compare his version of the database with Jill's, in order to see what Jill changed, and potentially, to merge changes between Fred and Jill. This is the classical "three-way merge" issue.

The processor, apparatus or computer system 1000 of the present invention fully supports a three-way comparison. The system 1000 may apply the partitioning to all three databases. The system 1000 may generate keys for all three databases. The system 1000 may then compare keys across all three databases, in order to identify whether objects are "added" or "removed" for each of the later databases in comparison to the "common ancestor" database. The resulting reporting and highlighting of the system 1000 may then more accurately indicate the actual changes that are performed.

Three Way Merging

If a three-way comparison is performed using the system 1000, then the actions to merge from the system 1000 may be different than in the two-way comparison/merge case for the system 1000. For a three-way merge, changes made in the "current" database relative to the common ancestor are preferably left alone, and preferably, changes made between the "comparison" database and the common ancestor are considered for merging. The system 1000 presents the results to the user in such a way that it is clear which case applies, and so that the user may easily chose the appropriate set of changes for merging.

Graphical User Interface

Figure 4A:
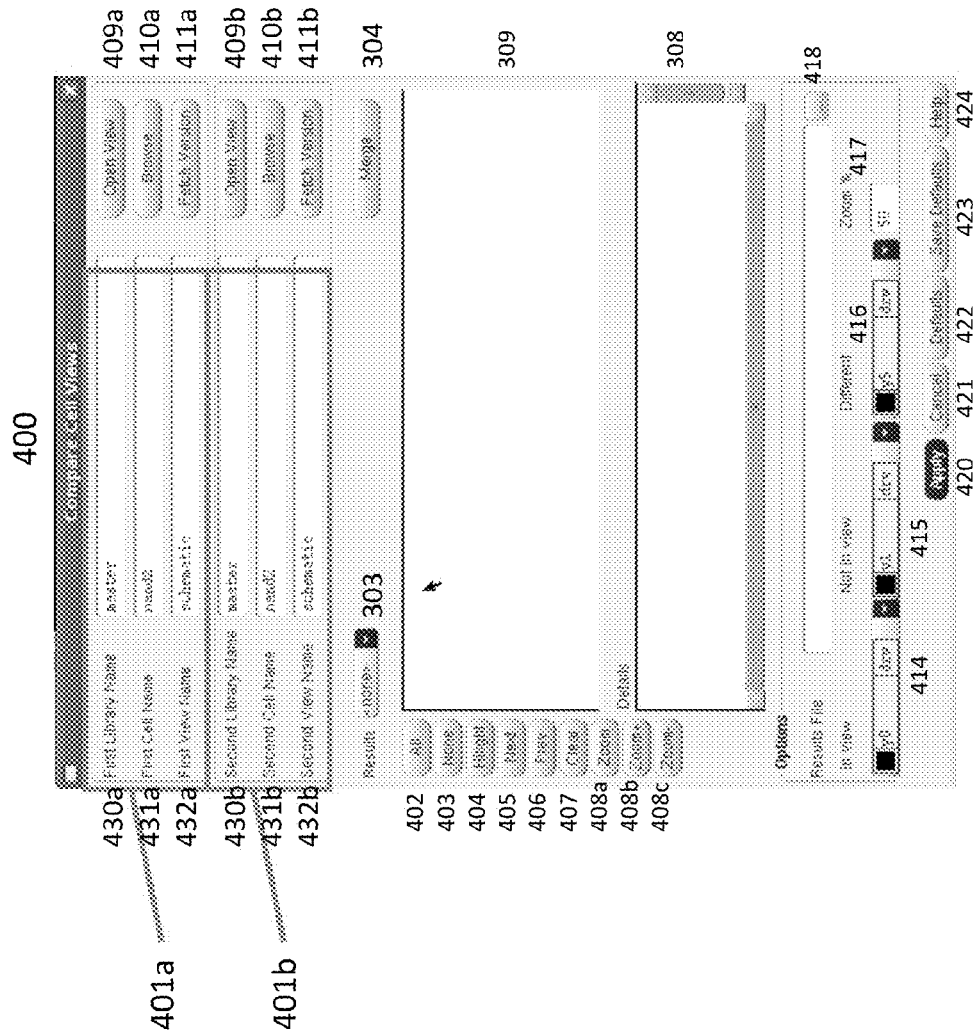
FIG. 4A illustrates a graphical user interface (GUI) of the present invention.

FIG. 4A illustrates a graphical user interface and display (GUI) 400 of the system 1000 of the present invention. FIG. 4A illustrates database name information 401*a* for the first database, and database name information 401*b* for the second database, where database name information includes library names (430*a*, 430*b*), cell names (431*a*, 431*b*), and view names (432*a*, 432*b*). The GUI includes several commands (implemented as buttons, fields, pull-down menus, or through other means). As illustrated in FIG. 4A, GUI commands include browsing for a cell view 410*a*, 410*b*, opening the cell view 409*a*, 409*b*, and fetching a different version 411*a*, 411*b*. Commands also include merging 304 from the first cell view to the second cell view. The GUI of FIG. 4A includes a drop-down field/menu 303. The GUI also includes commands that allow the user to select (through the computer mouse or other means) all differences 402, select no differences 403, highlight differences 404, proceed to the next difference 405, proceed to the previous difference 406, and clear selected differences 407.

As shown in FIG. 4A, the GUI display indicates cell view elements that are in the resulting view 414, not in the resulting view 415, and different between the current view and resulting view 416. Note that the fields 414, 415, 416 allow the user to select the means by which the difference elements are highlighted and allow the user to select the "layer" (and hence color) used for the highlighting. Using the GUI, the user may run the comparison 420, or cancel the operation 421 (dismiss the form). The GUI also includes commands that allow the user to zoom 408*a*, including zooming in 408b or zooming out 408c, with a zoom percentage 417 displayed. Other GUI commands allow the user to save the state of the GUI 423, restore the state of the GUI 422, or obtain help 424 including descriptions and tutorials.

Figure 4B:
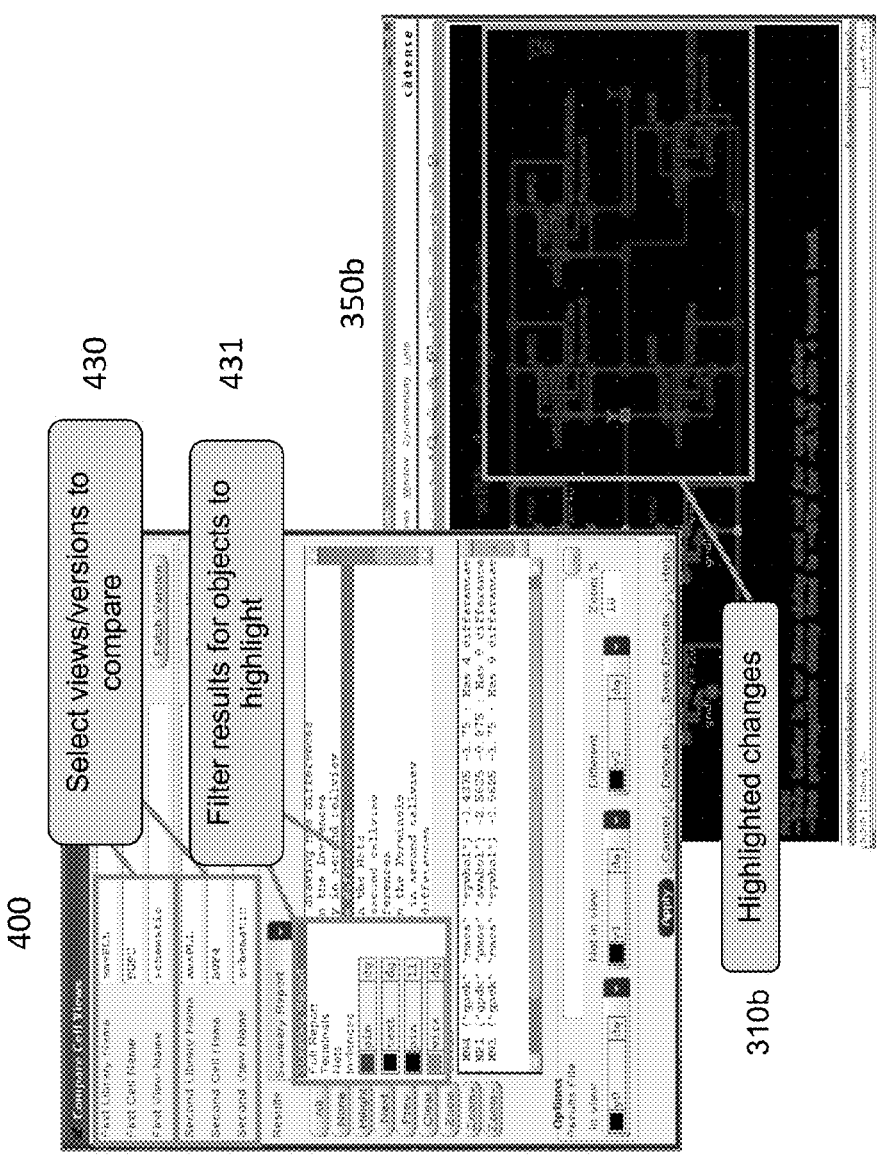
FIG. 4B illustrates a GUI of the present invention performing filtering.

The GUI 400 of FIG. 4B illustrates a filtering operation of the system 1000 for two cell views. The user may select 430 different cell views or database versions for comparison and filter 431 results for objects to highlight. The system 1000 performs a "diff" operation (determines the differences) and displays the results through highlighted differences 310b in a graphical view 350b and also through a textual output of the differences to an output file.

Figure 4C:
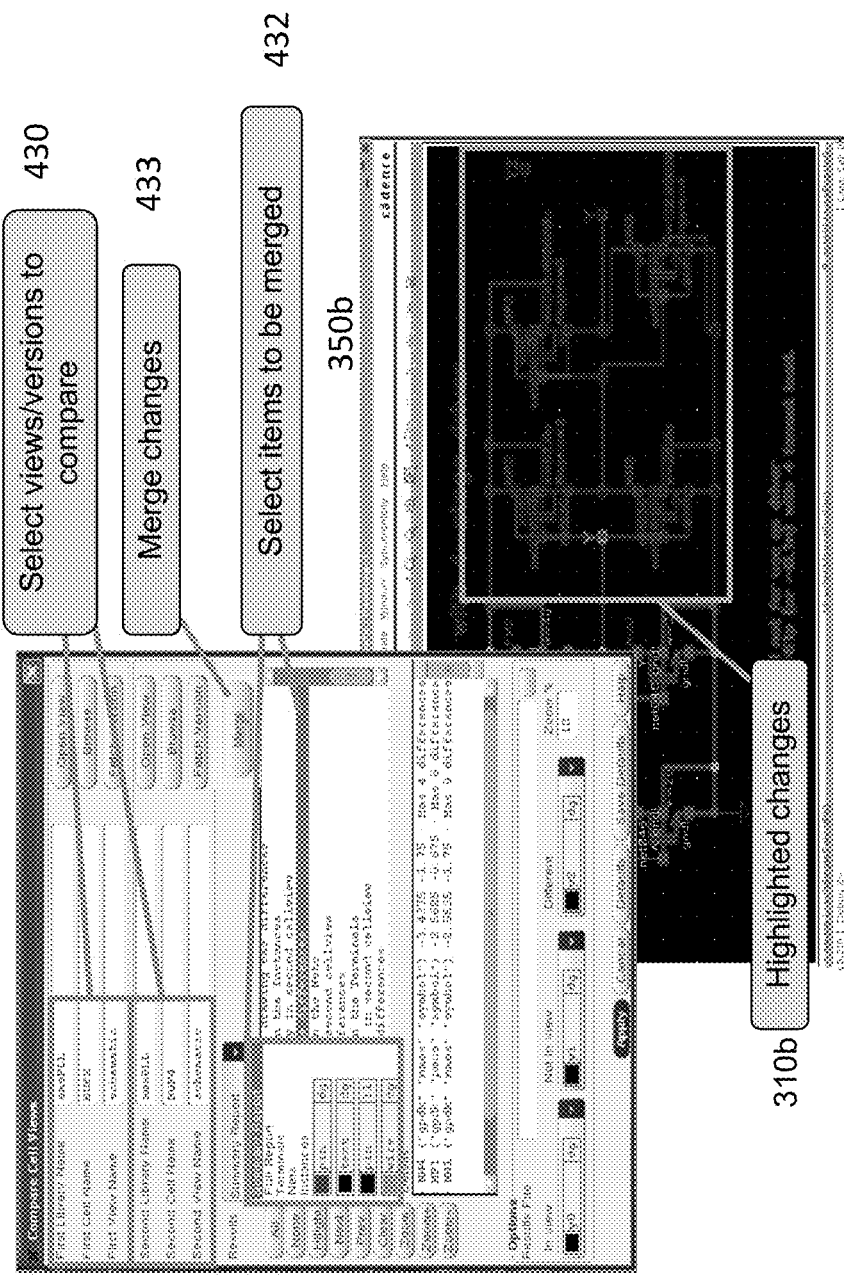
FIG. 4C illustrates a GUI of the present invention performing merging.

The GUI 400 of FIG. 4C illustrates a merging operation of the system 1000 for two cell views. The user may select 430 different cell views or database versions for comparison. The system 1000 performs a "diff" operation (determines the differences) and displays the results through highlighted differences 310b in a graphical view 350b and also through a textual output of the differences to an output file. The user may also select 432 items to be merged, and automatically merge 433 highlighted/selected differences.

As illustrated in FIG. 4C, the system 1000 is analogous to diff/merge for textual languages, and enables a user to manage changes from difference sources, select from those changes, and apply the selected changes. Aspects of the design may be merged individually, e.g., instances, or shapes on individual layers. The system 1000 is customizable to allow a user to define what types of elements to merge, e.g., ignore simple graphical manipulations. In addition, the system 1000 improves development productivity by allowing engineers to automatically merge cell views for which content differs.

Figure 5A:
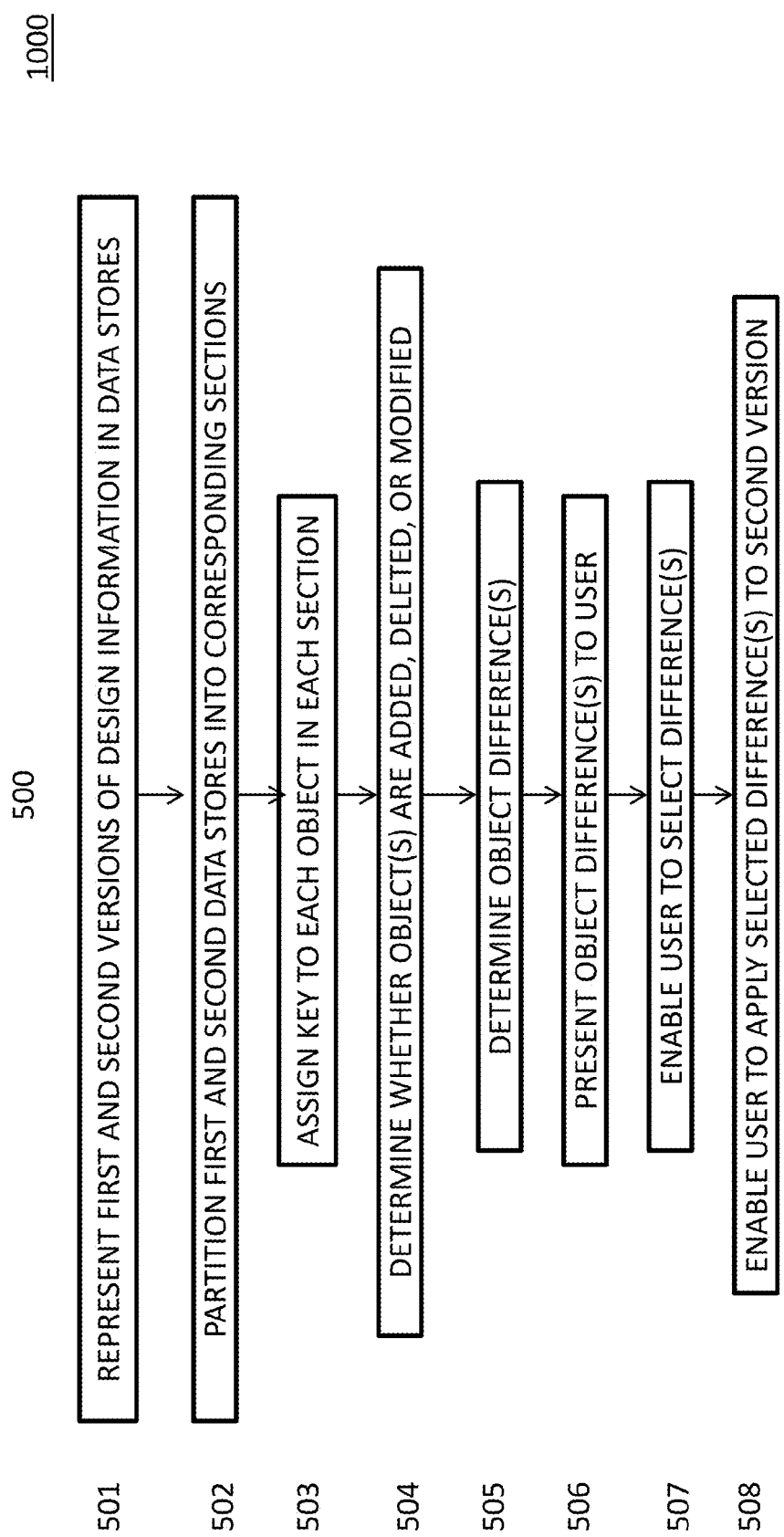
FIG. 5A illustrates a high-level flowchart of steps of the present invention.

FIG. 5A illustrates a high-level flowchart 500 of steps of a system or process 1000 embodying the present invention. In step 501, a first version of design information (from a first data store) and a second version of design information (from a second data store) are represented. The design information includes design objects. In step 502, the first and second data stores are partitioned (through a partitioning routine) into sections that correspond between the first and second data stores. In step 503, a key is assigned to each object in each section. Key assignment 503 is described in more detail in FIG. 5B to follow.

Referring back to FIG. 5A, step 504 determines whether an object of the section is added, deleted or modified, by performing a first comparison, based upon the keys of the objects in the section in the first data store and the keys of the objects in the corresponding section in the second data store. In step 505, one or more object differences are determined through a second comparison. For each given object in the first data store, and its corresponding object that shares the same key in the second data store, the second comparison is performed that determines one or more object differences. In step 506, the differences, resulting from the first and second comparisons, are presented to the user. In step 507, the system 1000 enables the user to select a set of at least one difference from the differences. In step 508, the system 1000 enables the user to apply the selected differences to the second version of the design information.

Figure 5B:
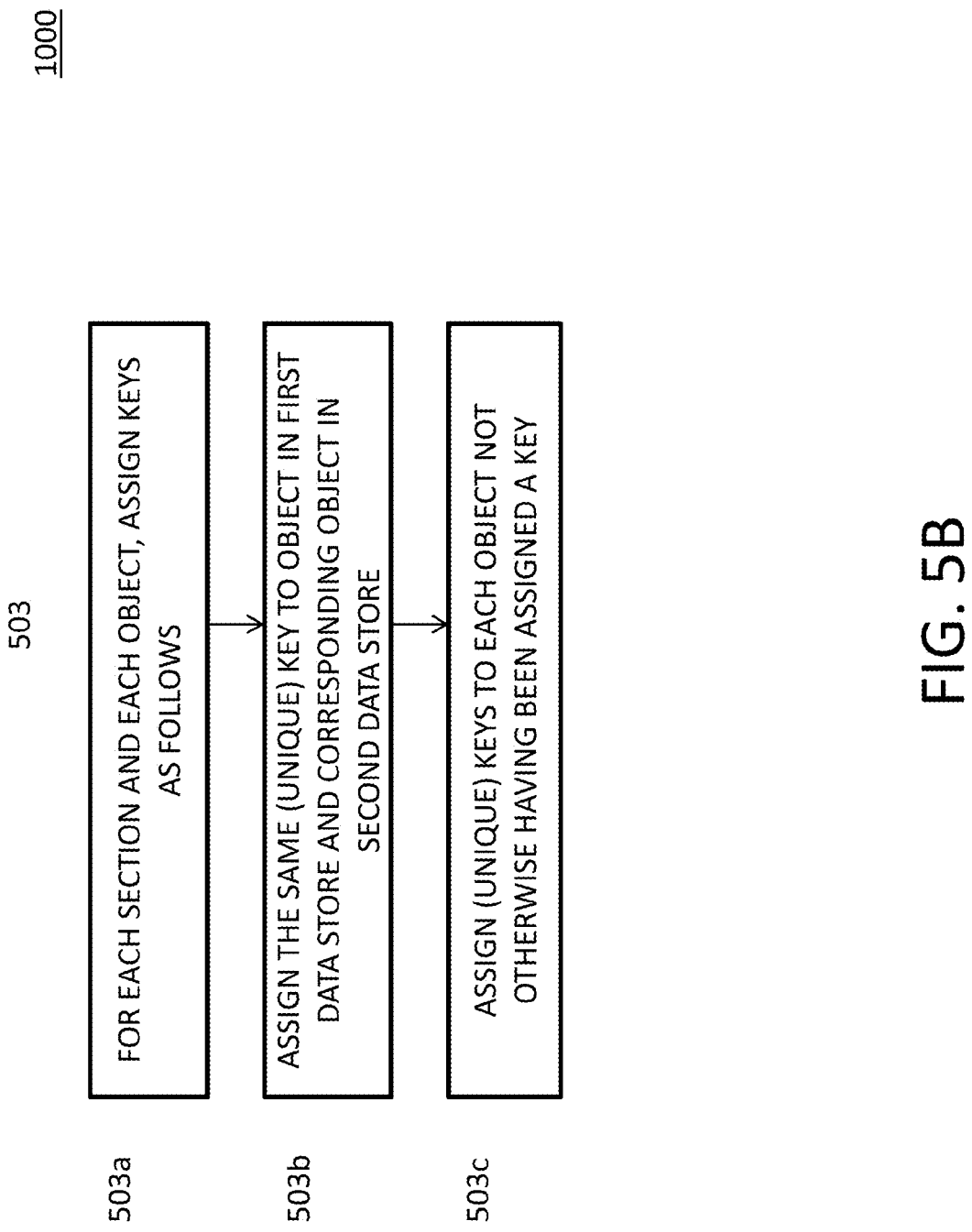
FIG. 5B illustrates a high-level flowchart of the key assignment algorithm of the present invention, in reference to FIG. 5A.

FIG. 5B illustrates a high-level flowchart of the key assignment algorithm (or key generation routine) 503 of the system or process 1000 of the present invention. Note, every set of data within the data stores that is associated with the partitioning routine also is associated with the key generation routine. In step 503a, for each section, a key is assigned to each object in the section (as follows). In step 503b, the same (unique) key is assigned to an object in a section in the first data store, and to an object in the corresponding section in the second data store. In step 503c, respective (unique) keys are assigned to each object not otherwise having been assigned a key. The keys may be generated based upon object position, object text, and/or other object attributes.

Figure 5C:
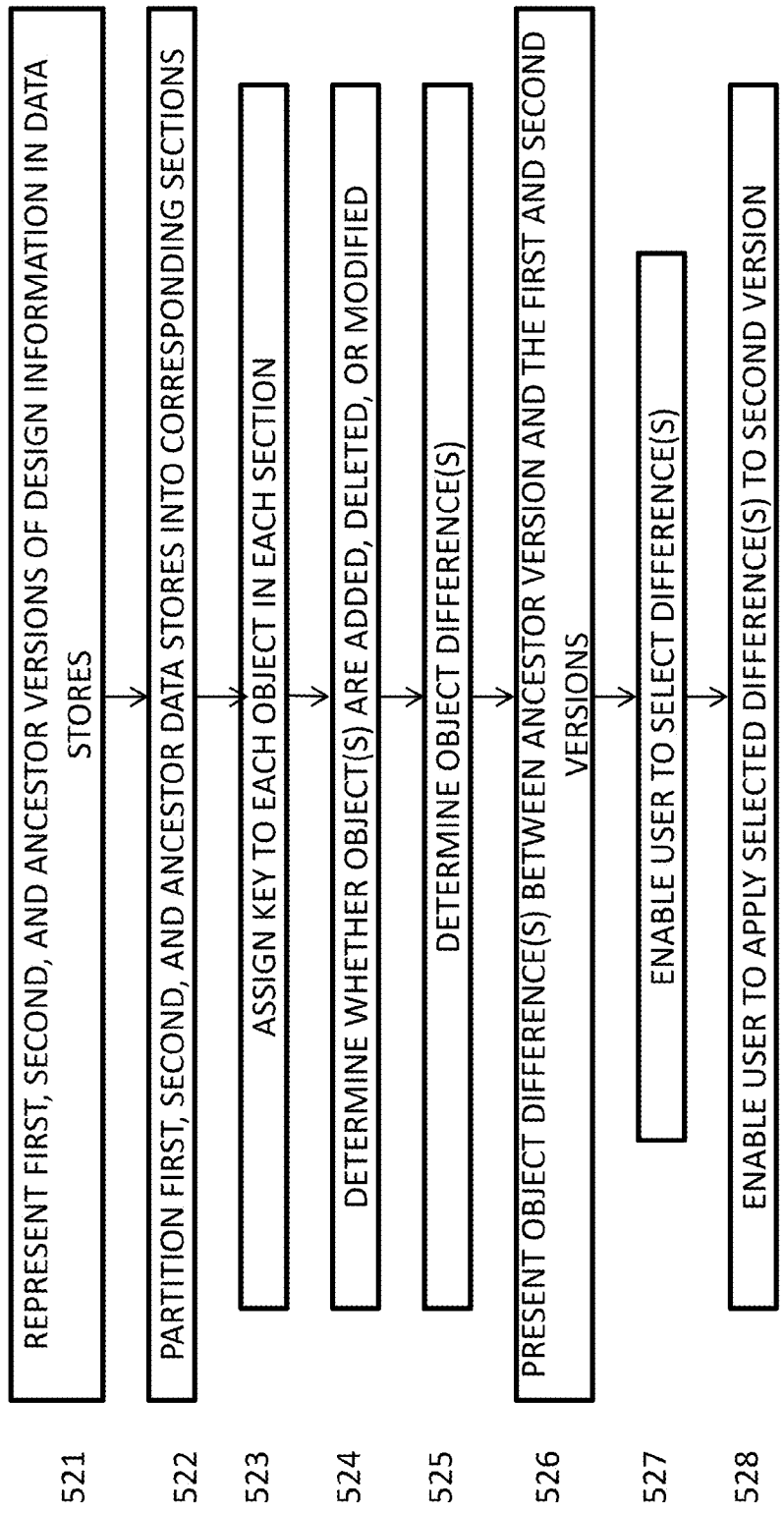
FIG. 5C illustrates a high-level flowchart of a three-way comparison and merge of the present invention.

FIG. 5C illustrates another high-level flowchart 520 of a system or process 1000 of the present invention, that depicts a three-way comparison and merge of the present invention. In step 521, a first version of design information (from a first data store), a second version of design information (from a second data store), and an ancestor version of design information (from an ancestor data store) are represented. The ancestor version of design information is an ancestor with respect to the first and second versions of the design information. In step 522, the first, second, and ancestor data stores are partitioned (through a partitioning routine) into sections that correspond between the ancestor and first and second data stores. In step 523, a key is assigned to each object in each section. The key assignment 523 is described in more detail in FIG. 5D to follow.

Referring back to FIG. 5C, step 524 determines whether an object of the section is added, deleted or modified, by performing a comparison, based upon the keys of the objects in the section in the ancestor data store and the corresponding sections in the first and second data store. In step 525, one or more object differences are determined through an additional comparison. For each given object in the first and second data stores, and its corresponding object that shares the same key in the ancestor data store, the additional comparison is performed that determines one or more object differences. In step 526, the differences, resulting from the comparisons, are presented to the user. In step 527, the system 1000 enables the user to select a set of at least one difference from the differences. In step 528, the system 1000 enables the user to apply the selected differences to the second version of the design information.

Figure 5D:
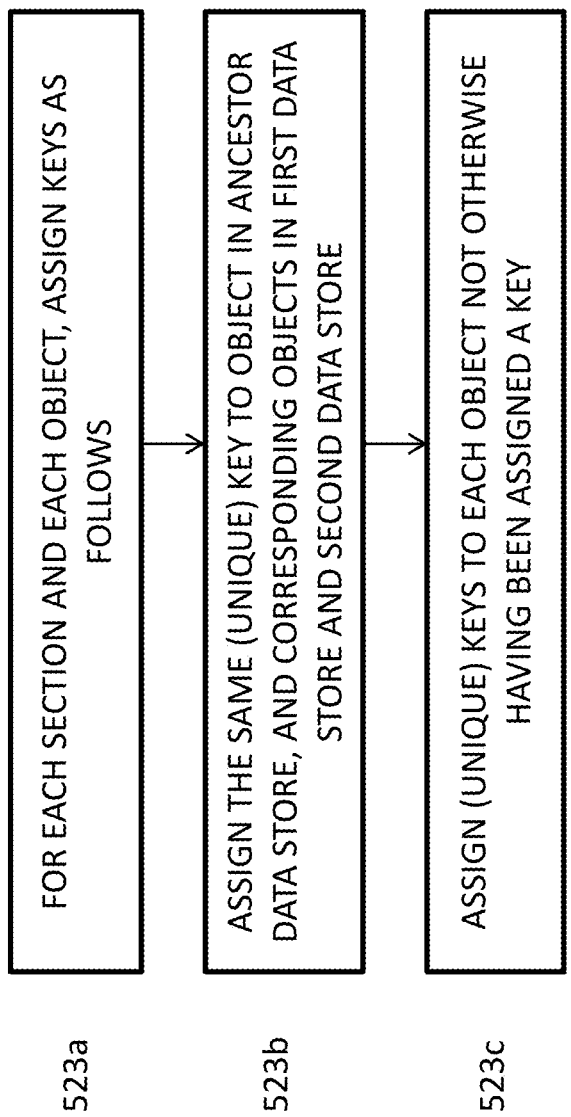
FIG. 5D illustrates a high-level flowchart of the key assignment algorithm of the present invention, in reference to FIG. 5C.

FIG. 5D illustrates a high-level flowchart of the key assignment algorithm (or key generation routine) 523 of the system or process 1000 of the present invention. Note, every set of data within the data stores that is associated with the partitioning routine also is associated with the key generation routine. In step 523a, for each section, a key is assigned to each object in the section (as follows). In step 523b, the same (unique) key is assigned to an object in a section in the ancestor data store, and to corresponding objects in the first and second data stores. In step 523c, respective (unique) keys are assigned to each object not otherwise having been assigned a key. The keys may be generated based upon object position, object text, and/or other object attributes.

Figure 6:
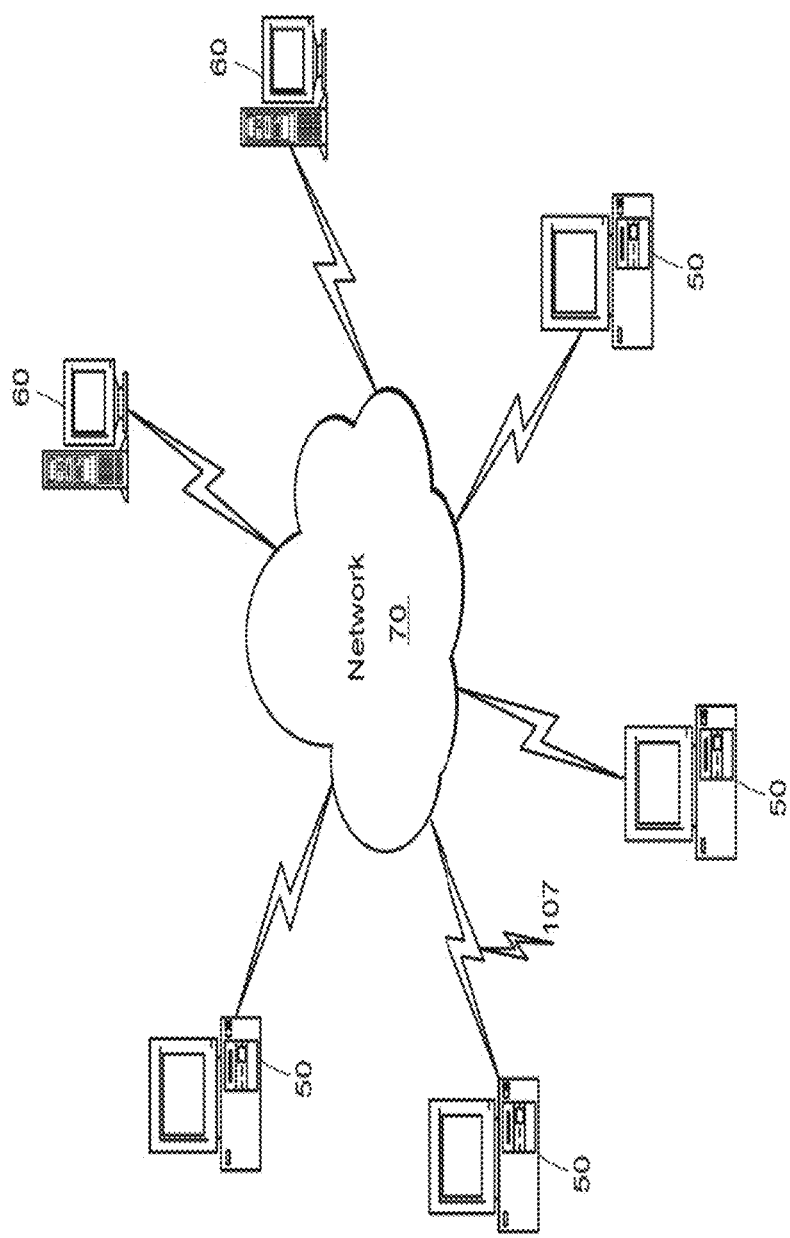
FIG. 6 illustrates a computer network or similar digital processing environment in which embodiments of the present invention may be implemented.

FIG. 6 illustrates a computer network or similar digital processing environment in which the proposed approach may be implemented.

Client computer(s)/devices 50 and server computer(s) 60 provide processing, storage, and input/output devices executing application programs and the like. Client computer(s)/devices 50 may also be linked through communications network 70 to other computing devices, including other client devices/processes 50 and server computer(s) 60. Communications network 70 may be part of a remote access network, a global or local network (e.g., the Internet), a worldwide collection of computers, Local area or Wide area networks, and gateways that currently use respective protocols (TCP/IP, BLUETOOTH™, etc.) to communicate with one another. Other electronic device/computer network architectures are suitable.

Figure 7:
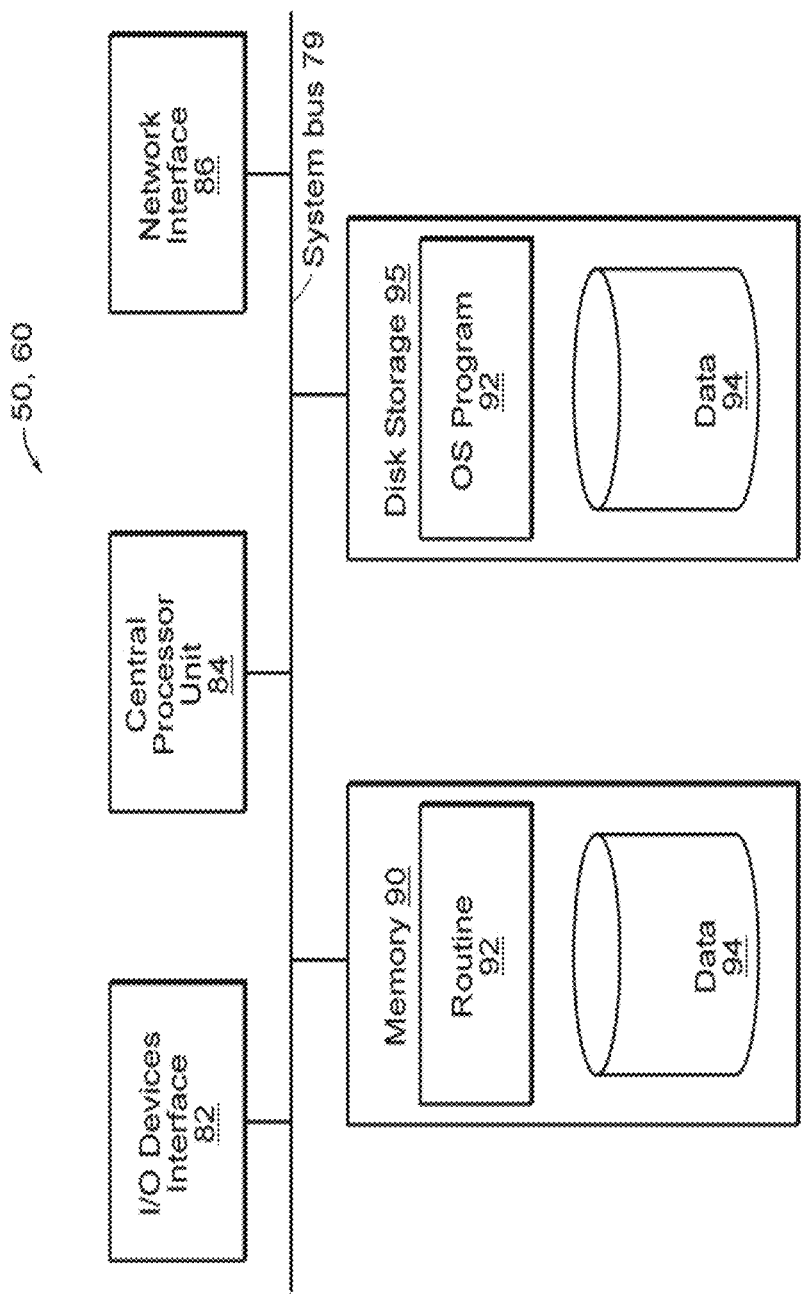
FIG. 7 is a block diagram of the internal structure of a computer in the computer network of FIG. 6.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the proposed approach (e.g., system 1000 and process steps/flow 400 detailed above). Disk storage 95 provides non-volatile storage for computer software instructions 92 and data 94 used to implement an embodiment of the proposed approach. Note, data 94 may be the same between a client 50 and server 60, however, the type of computer software instructions 92 may differ between a client 50 and a server 60. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 may be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 (shown in FIG. 6) embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the proposed approach routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The proposed approach applies to an IC design environment for both analog and digital components. The proposed approach is not limited to ICs, and may also be applied to printed circuit boards (PCBs), schematics, and other usages for analog and/or digital circuitry. The proposed approach handles designs of multiple dimensions, including but not limited to, two or three dimensions.

While this invention has been particularly shown and described with references to example embodiments thereof, it will be understood by those skilled in the art that various changes in form and details may be made therein without departing from the scope of the invention encompassed by the appended claims.

What is claimed:

1. A computer-implemented method for managing integrated circuit (IC) design information, the computer-implemented method comprising:
   representing a first version of a subject IC design information in a first data store;
   representing a second version of the subject IC design information in a second data store;
   partitioning the first data store into a plurality of sections, each section holding respective objects representing portions of the subject IC design information in the first version;
   partitioning the second data store into sections corresponding to the plurality of sections of the first data store, each section of the second data store holding respective objects representing portions of the subject IC design information in the second version;
   for each section, assigning a key to each object in the section according to an aspect of the objects, such that said assigning of keys results in:
   (a) a same key being assigned to
   (i) a subject object in a section in the first data store and to
   (ii) an object in the corresponding section in the second data store that is a corresponding object to the subject object in the first data store, and results in
   (b) respective keys being assigned to each object not otherwise having been assigned a key;
   for each given section, determining whether an object of the section is added, deleted or modified, by performing a first comparison, based upon keys of the objects in the section in the first data store and keys of the objects in the corresponding section in the second data store;
   for each given object in the first data store, and its corresponding object that shares the same key in the second data store, performing a second comparison that determines one or more object differences;
   based on results of the first and second comparisons, presenting one or more differences between the first version of the subject IC design information in the first data store and the second version of the subject IC design information in the second data store;
   enabling an end user to select a difference set of at least one of the one or more differences; and
   enabling the end user to apply the selected difference set to the second version of the subject IC design information in the second data store.

2. The computer-implemented method of claim 1 wherein the one or more differences are presented to an end user in a textual format.

3. The computer-implemented method of claim 1 wherein the one or more differences are presented to an end user by highlighting each difference on a graphical representation.

4. The computer-implemented method of claim 1 wherein assigning a key to each object includes assigning the key based on any combination of positional information and property information of the object.

5. The computer-implemented method of claim 1 further comprising:
representing an ancestor version of the subject IC design information in an ancestor data store, the first and second versions being from the ancestor version;
partitioning the ancestor data store into sections corresponding to the plurality of sections of the first data store and the second data store, each section of the ancestor data store holding respective objects representing portions of the IC design information in the ancestor version;
for each section in the ancestor data store, assigning a key to each object according to the aspect of the objects, such that for each section of the ancestor data store:
(1) a same key is assigned to a given object in the section of the ancestor data store and corresponding objects in corresponding sections of the first data store and the second data store that correspond to the given object in the ancestor data store, and
(2) respective keys are assigned to remaining objects in the section of the ancestor data store;
for each given section, determining whether an object of the section is added, deleted or modified, by performing a third comparison, based upon keys of the objects in the section in the first and second data stores and keys of the objects in the corresponding section in the ancestor data store;
for each given object in the first and second data stores, and its corresponding object that shares the same key in the ancestor data store, performing a fourth comparison that determines one or more respective object differences;
based on results of the third and fourth comparisons, presenting at least one difference between the ancestor version of the subject IC design information in the ancestor data store, and at least one of the first version of the subject IC design information in the first data store and the second version of the subject IC design information in the second data store;
enabling an end user to select a respective difference set of at least one of the at least one difference; and
enabling the end user to apply the selected respective difference set to the second version of the subject IC design information in the second data store.

6. A computer-implemented system for managing integrated circuit (IC) design information, the computer-implemented system comprising:
at least one processor configured to implement:
a data module configured to represent a first version of a subject IC design information in a first data store;
the data module further configured to represent a second version of the subject IC design information in a second data store;
a partitioning module configured to partition the first data store into a plurality of sections, each section holding respective objects representing portions of the subject IC design information in the first version;
the partitioning module further configured to partition the second data store into sections corresponding to the plurality of sections of the first data store, each section of the second data store holding respective objects representing portions of the subject IC design information in the second version;
a control module, configured to assign, for each section, a key to each object in the section according to an aspect of the objects, such that assignment by the control module of keys results in:
(a) a same key being assigned, by the control module, to
(i) a subject object in a section in the first data store and to
(ii) an object in the corresponding section in the second data store that is a corresponding object to the subject object in the first data store, and results in
(b) respective keys being assigned, by the control module, to each object not otherwise having been assigned a key by the control module;
the control module, further configured to determine, for each given section, whether an object of the section is added, deleted or modified, by performing a first comparison, based upon keys of the objects in the section in the first data store and keys of the objects in the corresponding section in the second data store;
the control module, further configured to perform a second comparison, for each given object in the first data store, and its corresponding object that shares the same key in the second data store, the second comparison determining one or more object differences; and
a display module, configured to present, based on results of the first and second comparisons, one or more differences between the first version of the subject IC design information in the first data store and the second version of the subject IC design information in the second data store;
the control module, further configured to enable an end user to select a difference set of at least one of the one or more differences; and
the control module, further configured to enable the end user to apply the selected difference set to the second version of the subject IC design information in the second data store.

7. The computer-implemented system of claim 6 wherein the display module is further configured to present the one or more differences to an end user in a textual format.

8. The computer-implemented system of claim 6 wherein the display module is further configured to present the one or more differences to an end user by highlighting each difference on a graphical representation.

9. The computer-implemented system of claim 6 wherein the control module is further configured to assign a key to each object, the control module assigning the key based on any combination of positional information and property information of the object.

10. The computer-implemented system of claim 6 wherein
the data module is further configured to represent an ancestor version of the subject IC design information in an ancestor data store, the first and second versions being from the ancestor version;
the partitioning module is further configured to partition the ancestor data store into sections corresponding to the plurality of sections of the first data store and the second data store, each section of the ancestor data store holding respective objects representing portions of the IC design information in the ancestor version;
the control module is further configured to assign, for each section in the ancestor data store, a key to each object according to the aspect of the objects, such that for each section of the ancestor data store:
(1) a same key is assigned, by the control module, to a given object in the section of the ancestor data store and corresponding objects in corresponding sections of the first data store and the second data store that correspond to the given object in the ancestor data store, and (2) respective keys are assigned, by the control module, to remaining objects in the section of the ancestor data store;

the control module is further configured to determine, for each given section, whether an object of the section is added, deleted or modified, by performing a third comparison, based upon keys of the objects in the section in the first and second data stores and keys of the objects in the corresponding section in the ancestor data store;

the control module is further configured to perform a fourth comparison, for each given object in the first and second data stores, and its corresponding object that shares the same key in the ancestor data store, the further comparison determining one or more respective object differences;

the display module is further configured to present, based on results of the third and fourth comparisons, at least one difference between the ancestor version of the subject IC design information in the ancestor data store, and at least one of the first version of the subject IC design information in the first data store and the second version of the subject IC design information in the second data store;

the control module is further configured to enable an end user to select a respective difference set of at least one of the at least one difference; and the control module is further configured to enable the end user to apply the selected respective difference set to the second version of the subject IC design information in the second data store.

11. A non-transitory computer readable medium having stored thereon a sequence of instructions which, when loaded and executed by a processor coupled to an apparatus, causes the apparatus to:

represent a first version of a subject IC design information in a first data store;

represent a second version of the subject IC design information in a second data store;

partition the first data store into a plurality of sections, each section holding respective objects representing portions of the subject IC design information in the first version;

partition the second data store into sections corresponding to the plurality of sections of the first data store, each section of the second data store holding respective objects representing portions of the subject IC design information in the second version;

assign, for each section, a key to each object in the section according to an aspect of the objects, such that assignment of keys results in:

(a) a same key being assigned to (i) a subject object in a section in the first data store and to (ii) an object in the corresponding section in the second data store that is a corresponding object to the subject object in the first data store, and results in (b) respective keys being assigned to each object not otherwise having been assigned a key;

determine, for each given section, whether an object of the section is added, deleted or modified, by performing a first comparison, based upon keys of the objects in the section in the first data store and keys of the objects in the corresponding section in the second data store;

perform a second comparison, for each given object in the first data store, and its corresponding object that shares the same key in the second data store, the second comparison determining one or more object differences;

present, based on results of the first and second comparisons, one or more differences between the first version of the subject IC design information in the first data store and the second version of the subject IC design information in the second data store, enable an end user to select a difference set of at least one of the one or more differences; and enable the end user to apply the selected difference set to the second version of the subject IC design information in the second data store.

12. The non-transitory computer readable medium of claim 11 that further causes the apparatus to present the one or more differences to an end user in a textual format.

13. The non-transitory computer readable medium of claim 11 that further causes the apparatus to present the one or more differences to an end user by highlighting each difference on a graphical representation.

14. The non-transitory computer readable medium of claim 11 that further causes the apparatus to assign a key to each object, the apparatus assigning the key based on any combination of positional information and property information of the object.

15. The non-transitory computer readable medium of claim 11 that further causes the apparatus to:

represent an ancestor version of the subject IC design information in an ancestor data store, the first and second versions being from the ancestor version;

partition the ancestor data store into sections corresponding to the plurality of sections of the first data store and the second data store, each section of the ancestor data store holding respective objects representing portions of the IC design information in the ancestor version;

assign, for each section in the ancestor data store, a key to each object according to the aspect of the objects, such that for each section of the ancestor data store:

(1) a same key being assigned to a given object in the section of the ancestor data store and corresponding objects in corresponding sections of the first data store and the second data store that correspond to the given object in the ancestor data store, and (2) respective keys being assigned to remaining objects in the section of the ancestor data store;

determine, for each given section, whether an object of the section is added, deleted or modified, by performing a third comparison, based upon keys of the objects in the section in the first and second data stores and keys of the objects in the corresponding section in the ancestor data store;

perform a fourth comparison, for each given object in the first and second data stores, and its corresponding object that shares the same key in the ancestor data store, the fourth comparison determining one or more respective object differences;

present, based on results of the third and fourth comparisons, at least one difference between the ancestor version of the subject IC design information in the ancestor data store, and at least one of the first version of the subject IC design information in the first data store and the second version of the subject IC design information in the second data store;

enable an end user to select a respective difference set of at least one of the at least one difference; and enable the end user to apply the selected respective difference set to the second version of the subject IC design information in the second data store.

* * * * *